United States Patent [19]
Faigle et al.

[11] Patent Number: 5,927,753
[45] Date of Patent: Jul. 27, 1999

[54] VEHICLE OCCUPANT PROTECTION APPARATUS

[75] Inventors: Ernst M. Faigle, Dryden; Tracy S. Sparks, Lapeer, both of Mich.

[73] Assignee: TRW Vehicle Safety Systems Inc., Lyndhurst, Ohio

[21] Appl. No.: 08/990,590

[22] Filed: Dec. 15, 1997

[51] Int. Cl.[6] .................................................. B60R 21/26
[52] U.S. Cl. ............................ 280/735; 280/742; 701/45
[58] Field of Search .................................. 280/735, 736, 280/737, 740, 742, 741; 251/129.15, 129.18; 137/487.5; 701/45

[56] References Cited

U.S. PATENT DOCUMENTS

| | | | |
|---|---|---|---|
| 3,684,309 | 8/1972 | Uchiyamada et al. | 280/735 |
| 3,752,500 | 8/1973 | Culver | 280/736 |
| 3,822,724 | 7/1974 | Clapp et al. | |
| 4,006,919 | 2/1977 | Neuman | 280/742 |
| 4,258,931 | 3/1981 | Lee et al. | |
| 5,224,733 | 7/1993 | Simsic | |
| 5,251,659 | 10/1993 | Sturman et al. | |
| 5,304,971 | 4/1994 | Sturman et al. | |
| 5,348,344 | 9/1994 | Blumenthal et al. | |
| 5,413,378 | 5/1995 | Steffens, Jr. et al. | |
| 5,551,723 | 9/1996 | Mahon et al. | |
| 5,566,976 | 10/1996 | Cuevas | |
| 5,609,359 | 3/1997 | Johnson et al. | |
| 5,820,162 | 10/1998 | Fink | 280/742 |

FOREIGN PATENT DOCUMENTS

WO9734785  9/1997  WIPO.

OTHER PUBLICATIONS

U.S. Patent Application Serial No. 09/046,467, filed Mar. 23, 1998, entitled "Vehicle Occupant Protection Apparatus.".
U.S. Patent Appln. Serial No. 08/906,042, filed Aug. 5, 1997, entitled "Vehicle Occupant Protection Apparatus".
U.S. Patent Appln. Serial No. 08/923,277, filed Aug. 5, 1997, entitled "Vehicle Occupant Protection Apparatus".

*Primary Examiner*—Paul N. Dickson
*Attorney, Agent, or Firm*—Tarolli, Sundheim, Covell, Tummino & Szabo

[57] ABSTRACT

An apparatus (10) includes an inflatable vehicle occupant protection device (14), a source (16) of inflation fluid, and a valve (20) in an inflation fluid flow path extending from the source (16) to the protection device (14) through the valve (20). The valve (20) is actuatable to regulate a flow of inflation fluid through the valve (20) so as to vary rates at which inflation fluid pressure increases in the protection device (14). A controller (22) has a memory location (29) storing predetermined modes of actuation for the valve (20). The predetermined modes of actuation include modes that correspond to predetermined curves (A–E) of inflation fluid pressure versus time. The controller (22) responds to one or more crash conditions by selecting one of the predetermined modes of actuation and by actuating the valve (20) in the selected mode.

5 Claims, 2 Drawing Sheets

VEHICLE OCCUPANT PROTECTION APPARATUS

FIELD OF THE INVENTION

The present invention relates to an apparatus for inflating an inflatable vehicle occupant protection device.

BACKGROUND OF THE INVENTION

An inflatable vehicle occupant protection device, such as an air bag, is inflated upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated and emits inflation fluid which inflates the air bag into the vehicle occupant compartment. The air bag can then engage a vehicle occupant to help protect the occupant from a forceful impact with parts of the vehicle as a result of the crash.

The manner in which the inflating air bag engages the vehicle occupant can be influenced by conditions such as the severity of the crash and the size, weight and position of the occupant. Therefore, it may be desirable to regulate the inflation fluid pressure in the air bag in response to one or more of these conditions.

SUMMARY OF THE INVENTION

In accordance with the present invention, an apparatus comprises an inflatable vehicle occupant protection device, a source of inflation fluid, and a valve. An inflation fluid flow path extends from the source to the protection device through the valve. The valve is actuatable to regulate a flow of inflation fluid through the valve so as to vary rates at which inflation fluid pressure increases in the protection device.

The apparatus further comprises storing means and responding means. The storing means stores predetermined modes of actuation for the valve. The predetermined modes of actuation comprise modes that correspond to predetermined curves of inflation fluid pressure versus time. The responding means responds to one or more crash conditions by selecting one of the predetermined modes of actuation and by actuating the valve in the selected mode.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein.

DESCRIPTION OF PREFERRED EMBODIMENTS

Figure 1:
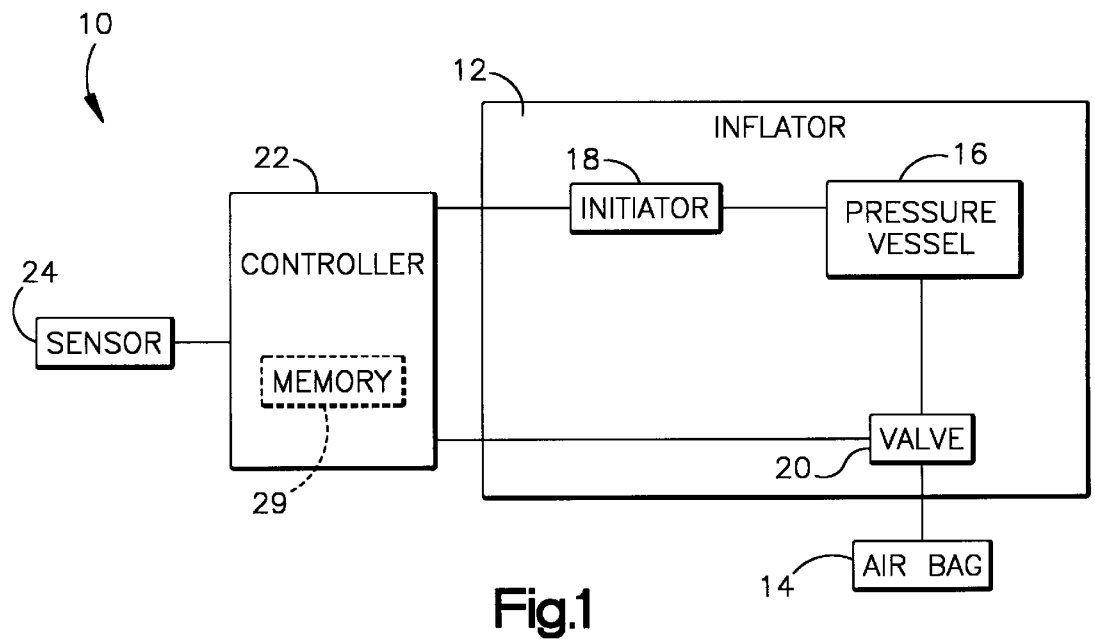
FIG. 1 is a block diagram of a vehicle occupant protection apparatus comprising a first embodiment of the present invention.

A vehicle occupant protection apparatus 10 comprising a first embodiment of the present invention is shown schematically in FIG. 1. The apparatus 10 includes an inflator 12 and a particular type of inflatable vehicle occupant protection device 14 which is known as an air bag. Other inflatable vehicle occupant protection devices that can be used in accordance with the invention include, for example, inflatable seat belts, inflatable knee bolsters, inflatable head liners or side curtains, and knee bolsters operated by inflatable air bags. When the air bag 14 is inflated, it extends into a vehicle occupant compartment (not shown) to help protect a vehicle occupant from a forceful impact with parts of the vehicle as a result of a crash.

The inflator 12 comprises a source 16 of inflation fluid for inflating the air bag 14. The source 16 of inflation fluid in the first embodiment of the present invention is a pressure vessel storing inflation fluid under pressure. A preferred inflation fluid consists essentially of helium at a storage pressure within the range of about 4,000 psi to about 7,000 psi. However, the inflation fluid stored in the pressure vessel 16 may have any other composition and storage pressure suitable for inflating the air bag 14. Moreover, the inflator 12 may comprise an alternative source of inflation fluid, such as a body of ignitable gas generating material or a combination of pressurized inflation fluid and ignitable material for heating the inflation fluid. The ignitable material could comprise a fuel gas or a combustible mixture of gases. Such a combustible mixture of gases would preferably have a composition in accordance with the invention set forth in U.S. Pat. No. 5,348,344, assigned to TRW Vehicle Safety Systems Inc.

The inflator 12 includes an initiator 18 and a valve 20. The initiator 18 functions to open the pressure vessel 16 to initiate an outlet flow of inflation fluid from the pressure vessel 16. The valve 20 functions to regulate the outlet flow of inflation fluid between the pressure vessel 16 and the air bag 14. A controller 22 actuates the initiator 18 and the valve 20 in response to a deployment signal received from a crash sensor 24.

The crash sensor 24 is a known device that senses a vehicle condition indicating the occurrence of a crash. If the vehicle condition sensed by the crash sensor 24 is at or above a predetermined threshold level, it indicates the occurrence of a crash having at least a predetermined threshold level of severity. The threshold level of crash severity is a level at which inflation of the air bag 14 is desired to help protect a vehicle occupant. The crash sensor 24 then provides the controller 22 with a deployment signal.

The vehicle condition sensed by the crash sensor 24 preferably comprises sudden vehicle deceleration that is caused by a crash. If the magnitude and duration of the deceleration meet or exceed predetermined threshold levels, they indicate the occurrence of a crash that meets or exceeds the predetermined threshold level of crash severity. The deployment signal is then transmitted to the controller 22 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 14 is to be inflated. The controller 22 responds to the deployment signal by actuating the initiator 18 to open the pressure vessel 16 upon the occurrence of a crash. The controller 22 further responds by actuating the valve 20 with reference to the severity of the crash as indicated by the deployment signal.

Figure 2:
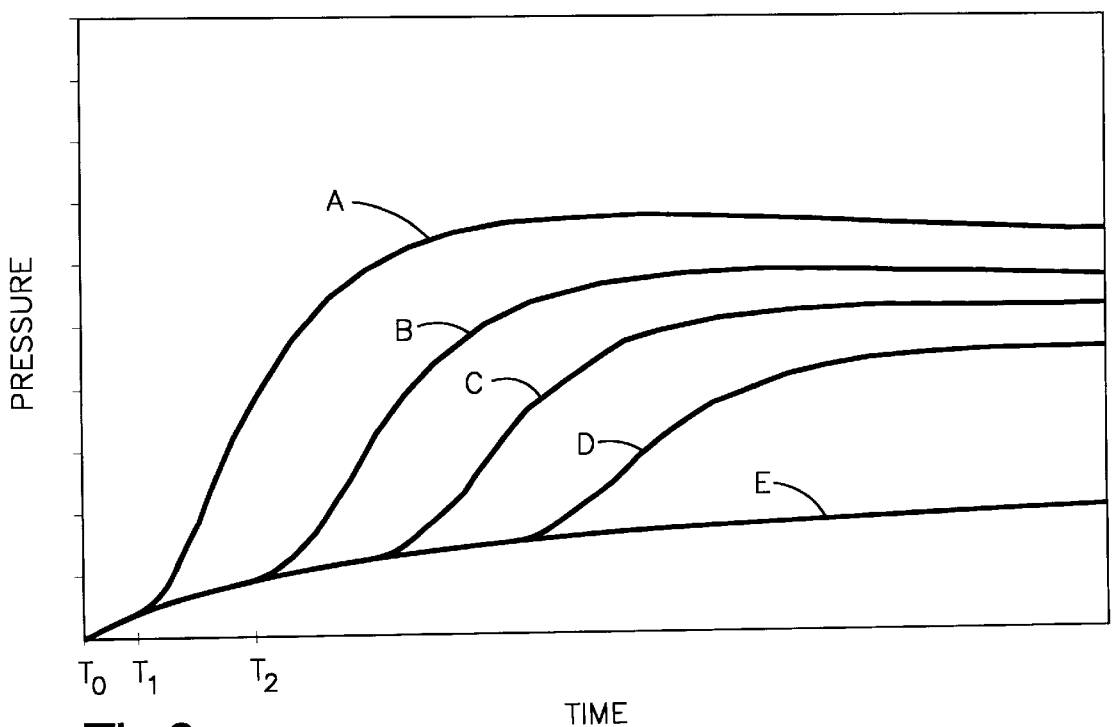
FIG. 2 is a graph showing a plurality of inflation fluid pressure curves.
Figure 3:
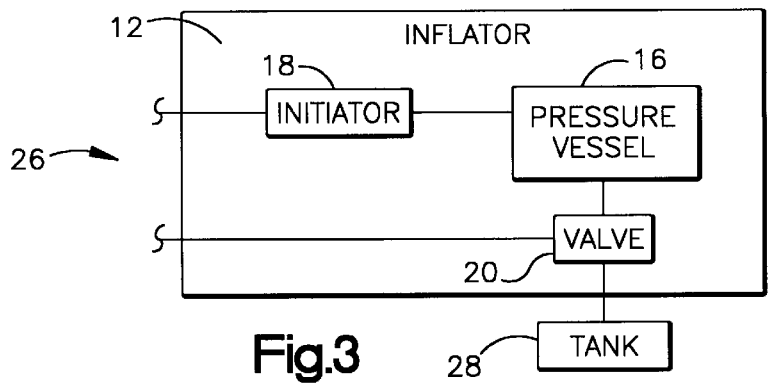
FIG. 3 is a block diagram of a test apparatus used in accordance with the present invention.

Five different inflation fluid pressure curves A–E are shown in FIG. 2. The curves A–E of FIG. 2 are examples of curves that can be predetermined in accordance with the present invention by the use of a test apparatus 26 (FIG. 3). As shown schematically in FIG. 3, the test apparatus 26 uses a test inflator like the inflator 12 of FIG. 1, but uses a tank 28 instead of an inflatable device like the air bag 14. The curves A–E represent fluid pressure levels measured over time in the tank 28 upon actuation of the valves 20 in five different test inflators 12. These curves A–E would be derived by actuating each valve 20 in a corresponding one of five different modes. The five different modes of actuation correspond to five different levels of crash severity. Accordingly, each of the five curves A–E of FIG. 2 corresponds to one of five different levels of crash severity. The first four curves A–D are known as S-curves. The first S-curve A corresponds to a relatively high level of crash severity. The second S-curve B corresponds to a somewhat lower level of crash severity. The third and fourth S-curves C and D correspond to successively lower levels of crash severity. The fifth curve E corresponds to a lowest level of crash severity.

As shown by the first S-curve A, the valve 20 in the first test inflator 12 is actuated in a mode that increases the pressure in the tank 28 gradually throughout an initial time period extending from $T_0$ to about $T_1$. Such actuation of the valve 20 in the vehicle occupant protection apparatus 10 of FIG. 1 would provide a "soft" initial stage of inflation in the air bag 14. The first S-curve A turns sharply upward at about $T_1$, and extends upward to indicate a subsequent stage of inflation in which the pressure in the air bag 14 would increase much more rapidly.

As shown by the second S-curve B, the valve 20 in the second test inflator 12 is actuated in a mode that increases the pressure in the tank 28 gradually throughout a longer initial time period extending from $T_0$ to about $T_2$. Such actuation of the valve 20 in the apparatus 10 would provide the air bag 14 with a longer soft stage of inflation appropriate for the lower level of crash severity. The second S-curve B also turns upward, but with a slope that is consistently less than the slope of the first S-curve A. This shows the pressure to increase at lower rates, and to reach a lower peak level at a later time, appropriately for the lower level of crash severity. Likewise, the third and fourth S-curves C and D have longer initial portions for correspondingly longer soft stages of inflation of the air bag 14, and turn upward with lesser slopes to reach successively lower peak pressure levels at successively later times.

Unlike the four S-curves A–D, the fifth curve E of FIG. 2 does not turn upward for a more rapid stage of inflation following a soft initial stage. Instead, the curve E indicates a sustained soft inflation in which the pressure in the air bag 14 would increase more steadily toward a lowest peak level.

The controller 22 has a memory location 29 (FIG. 1) storing data comprising a plurality of predetermined modes of actuation for the valve 20 in the apparatus 10. The stored modes of actuation correspond to a plurality of predetermined inflation fluid pressure curves, and include the modes of actuation described above with reference to the predetermined curves A–E of FIG. 2. Therefore, when the controller 22 actuates the valve 20 in one of the predetermined modes, the inflation fluid is directed from the pressure vessel 16 to the air bag 14 at flow rates that are correlated to a predetermined inflation fluid pressure curve. This is accomplished in a manner described more fully below with reference to operation of the valve 20.

As shown in FIG. 3, the inflator 14 further includes a diffuser 30 and a valve support structure 32. The diffuser 30 defines a diffuser chamber 34, and has a plurality of inflation fluid outlet openings 36 which direct inflation fluid from the inflator 12 toward the air bag 14. The support structure 32 supports the valve 20 at a location between the pressure vessel 16 and the diffuser 30.

The pressure vessel 16 comprises a cylindrical tank 40 defining a storage chamber 42 containing the pressurized inflation fluid. A burst disk 44 closes an outlet opening 46 in an end wall 48 of the tank 40. When the initiator 18 (shown schematically) is actuated, it ruptures the burst disk 44 to open the pressure vessel 16. The inflation fluid then begins to flow outward from the storage chamber 42 through the outlet opening 46.

The initiator 18 may comprise any known device suitable for rupturing the burst disk 44. If a fuel gas or other ignitable material were used to heat the inflation fluid, as noted above, the inflator 12 could be provided with an igniter separate from the initiator 18. Alternatively, the initiator 18 could comprise a known device that functions to rupture the burst disk 44 and also to ignite the ignitable material. However, the inflator 12 in the preferred embodiments of the present invention does not have such an ignitable material. When the initiator 18 ruptures the burst disk 44, the unheated inflation fluid begins to flow outward through the opening 46 under the influence of the pressure in the storage chamber 42. The pressure in the storage chamber 42 continuously decreases from the storage level to the ambient level as the unheated inflation fluid flows outward.

The support structure 32 defines a fluid flow space 50 extending from the outlet opening 46 to the diffuser chamber 34. The fluid flow space 50 includes a bore 52 extending through a base wall 54 of the support structure 32. The valve 20 (also shown schematically in FIG. 3) has an elongated housing 56 extending across the bore 52. A passage 60 extends fully through the housing 56 within the bore 52. In this arrangement, inflation fluid that flows outward through the bore 52 is directed through the passage 60 in the valve 20. Preferably, all of the inflation fluid that flows outward through the bore 52 is constrained to flow through the passage 60 in the valve 20.

The valve 20 in the first embodiment of the present invention is a fast-acting solenoid valve including a coil 70, an armature 72, and a spring 74. When the coil 70 is energized, it generates a magnetic field which urges the armature 72 to move longitudinally downward, as viewed in FIG. 3, against a bias of the spring 74. A valve head 76 is mounted on the end of the armature 72. When the armature 72 moves longitudinally, it moves the valve head 76 within the passage 60. Solenoid valves like the valve 20 are known, and the structural arrangement of the valve parts 56 and 70–76 could differ from that shown schematically in FIG. 3. For example, U.S. Pat. No. 5,251,659 shows a substantially similar solenoid valve that could be used in accordance with the present invention.

The valve 20 is normally open. The valve 20 thus provides an initial outlet flow area through the passage 60 in the bore 52. The initial outlet flow area is determined by the extent to which the valve head 76 projects across the passage 60 to constrict the passage 60. The valve 20 may thus have the normally open condition shown by way of example in FIG. 3. Alternatively, the valve head 76 could normally project a different distance across the passage 60 to provide a correspondingly different initial outlet flow area. In any case, when the armature 72 is moved upon actuation of the valve 20, it moves the valve head 76 so as to change the extent to which the valve head 76 constricts the passage 60. The outlet flow area is changed accordingly.

When the controller 22 actuates the initiator 18 upon the occurrence of a vehicle crash, the outlet flow area initially provided by the valve 20 limits the rates at which the inflation fluid can flow through the bore 52 under the influence of the fluid pressure in the storage chamber 42. However, the controller 22 responds to the level of crash severity by selecting one of the predetermined modes of actuation that are stored at the memory location 29, and by actuating the valve 20 in the selected mode. This causes the inflation fluid to flow from the pressure vessel 16 to the air bag 14 at rates correlated to the predetermined pressure curve that corresponds to the selected mode of actuation.

For example, if the crash severity is at a lowest level, the controller 22 may select a mode of actuation in which the valve 20 is maintained in its normally open condition. The unshifted valve 20 will not vary the rates at which the inflation fluid flows from the pressure vessel 16 to the air bag 14. The inflation fluid will then inflate the air bag 14 in a manner correlated to the fifth predetermined pressure curve E shown in FIG. 2.

The crash severity may have the relatively high level described above with reference to the first S-curve A of FIG. 2. If so, the controller 22 will respond by selecting a mode of actuation in which the valve 20 is shifted from its normally open condition to a further open condition at a time approaching about $T_1$ following actuation of the initiator 18. The valve 20 will then increase the outlet flow area in the passage 60. This will enable the inflation fluid to flow outward through the bore 52 at greater flow rates under the influence of the fluid pressure in the storage chamber 42. The greater flow rates through the bore 52 will cause the fluid pressure in the air bag 14 to increase at correspondingly greater rates. This is indicated in FIG. 2 where the first S-curve A turns sharply upward. The predetermined slopes of the first S-curve A indicate the predetermined amounts and/or the rates at which the valve 20 is to be shifted from the normally open condition in this mode of actuation.

In a similar manner, the controller 22 will select a mode of actuation that corresponds to the second S-curve B if the crash has the lower level of severity described above with reference to the second S-curve B. That mode of actuation delays shifting of the valve 20 until a time approaching about $T_2$ following actuation of the initiator 18. This prolongs the soft initial stage of inflation appropriately for the lower level of crash severity. The valve 20 is then shifted to a further open condition, but is shifted in relatively lesser amounts, and/or at lower rates, to provide the subsequent stage of inflation called for by the upturned portion of the second S-curve B.

If the crash severity has one of the successively lower levels described above with reference to the third and fourth S-curves C and D, the controller 22 will respond by selecting a corresponding mode of actuation for the valve 20. The selected mode will shift the valve 20 at a later time, and in lesser amounts and/or at lower rates, to provide the initial and subsequent stages of inflation indicated by the corresponding S-curve C or D. Importantly, shifting of the valve 20 occurs only under the direction of the controller 22 and is not affected by the inflation fluid pressure forces acting on the valve head 76 in the passage 60. This helps to ensure that the outlet flow areas provided by the valve 20 are provided at the times and in the amounts called for by the particular mode of actuation selected by the controller 22.

The controller 22 stores a plurality of additional modes of actuation corresponding to a plurality of additional predetermined inflation fluid pressure curves (not shown). Like each of the curves A–E shown in FIG. 2, each additional curve is predetermined to be appropriate for a particular level of crash severity. If the controller 22 selects one of these additional modes of actuation and shifts the valve 20 in the selected mode, the rates at which the inflation fluid flows to the air bag 14 will be correlated to an appropriate curve in the same manner as described above with reference to the curves A–E. Preferably, the controller 22 also stores a mode in which the valve 20 is actuated simultaneously with the initiator 18. This minimizes or effectively omits a soft initial stage of inflation. The air bag 14 can thus be inflated most rapidly in response to a crash having a highest level of severity.

Figure 4:
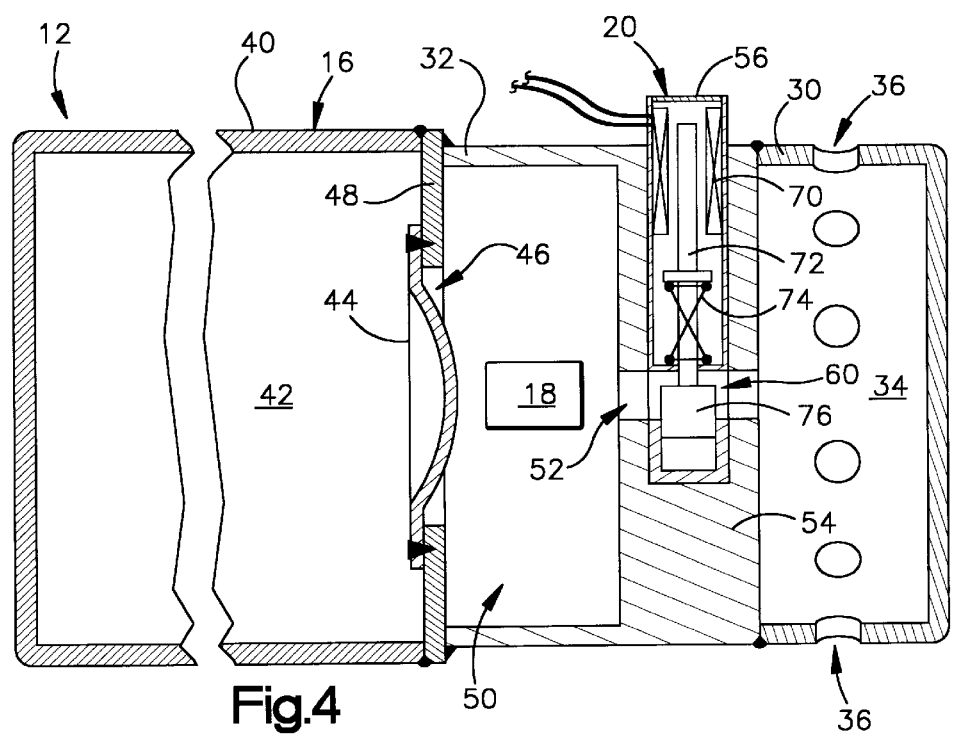
FIG. 4 is a side view, partly in section, of parts of the apparatus of FIG. 1.
Figure 5:
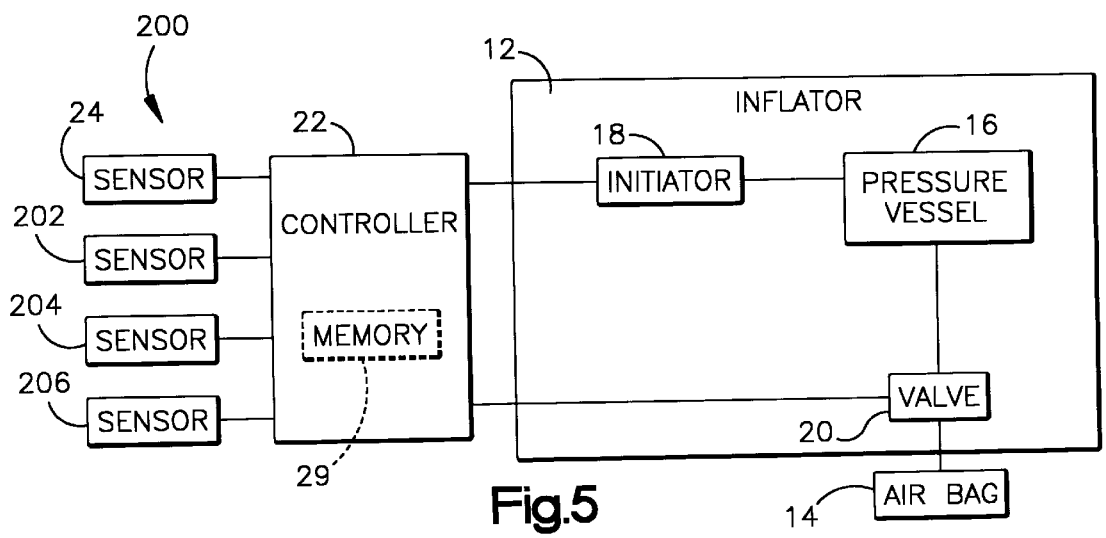
FIG. 5 is a block diagram of a vehicle occupant protection apparatus comprising a second embodiment of the present invention.

A vehicle occupant protection apparatus 200 comprising a second embodiment of the present invention is shown schematically in FIG. 4. The apparatus 200 includes a vehicle occupant condition sensor 202, a vehicle seat condition sensor 204, and a seat belt buckle sensor 206. The apparatus 200 is otherwise the same as the apparatus 10, as indicated by the use of the same reference numbers in FIGS. 4 and 1.

The occupant condition sensor 202 provides a signal indicating one or more conditions of a vehicle occupant. These can be the occupant's height, weight and/or position. The seat condition sensor 204 provides a signal indicating a condition of the occupant's seat. This could be the seat back angle or the forward/rearward position of the seat. The buckle sensor 206 provides a signal indicating whether or not the occupant is wearing a seat belt.

The controller 22 in the second embodiment uses the signals from the sensors 202–204, along with the signal from the crash sensor 24, to control the valve 20. In this manner, the controller 22 can select a mode of actuation corresponding to a predetermined inflation fluid pressure curve that is most appropriate for the concurrent crash conditions indicated by the sensors 24 and 202–206.

From the above description of the invention, those skilled in the art will perceive improvements, changes and modifications. For example, the crash conditions sensed by the sensors 24 and 202–206 are described by way of example only. Other vehicle or vehicle occupant conditions also could be considered for controlling a valve in accordance with the present invention. Such improvements, changes and modifications within the skill of the art are intended to be covered by the appended claims.

Having described the invention, the following is claimed:

1. Apparatus comprising:

an inflatable vehicle occupant protection device;

a source of inflation fluid;

a valve in an inflation fluid flow path extending from said source to said protection device through said valve, said valve being actuatable to regulate a flow of inflation fluid through said valve so as to vary rates at which inflation fluid pressure increases in said protection device;

means for storing predetermined modes of actuation for said valve, said predetermined modes of actuation comprising modes that correspond to predetermined curves of inflation fluid pressure versus time; and means for responding to one or more crash conditions by selecting one of said predetermined modes of actuation and by actuating said valve in said selected one of said predetermined modes.

2. Apparatus as defined in claim 1 wherein said predetermined curves include a plurality of S-curves.

3. Apparatus as defined in claim 1 wherein said source of inflation fluid comprises a pressure vessel storing inflation fluid at a storage pressure level, said apparatus further comprising means for causing said inflation fluid to flow from said pressure vessel to said valve in an unheated condition, with the fluid pressure in said pressure vessel continuously decreasing from said storage pressure level to an ambient pressure level as said unheated inflation fluid flows outward.

4. Apparatus as defined in claim 3 wherein said crash condition comprises at least one vehicle condition and at least one vehicle occupant condition.

5. Apparatus as defined in claim 3 wherein said valve is a solenoid valve.

\* \* \* \* \*